June 17, 1941. H. W. WEBB 2,245,840
FILTER MEDIUM
Filed Aug. 29, 1936
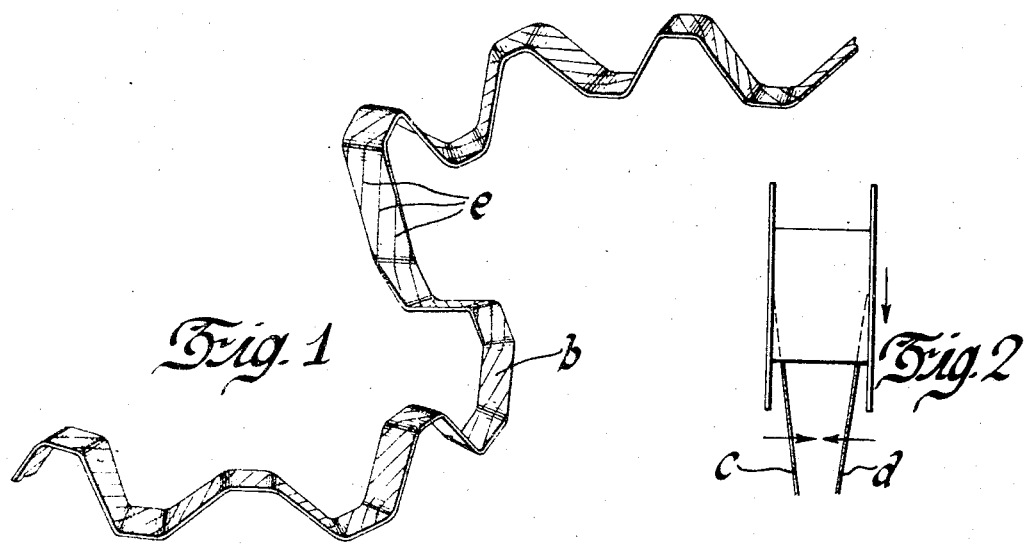
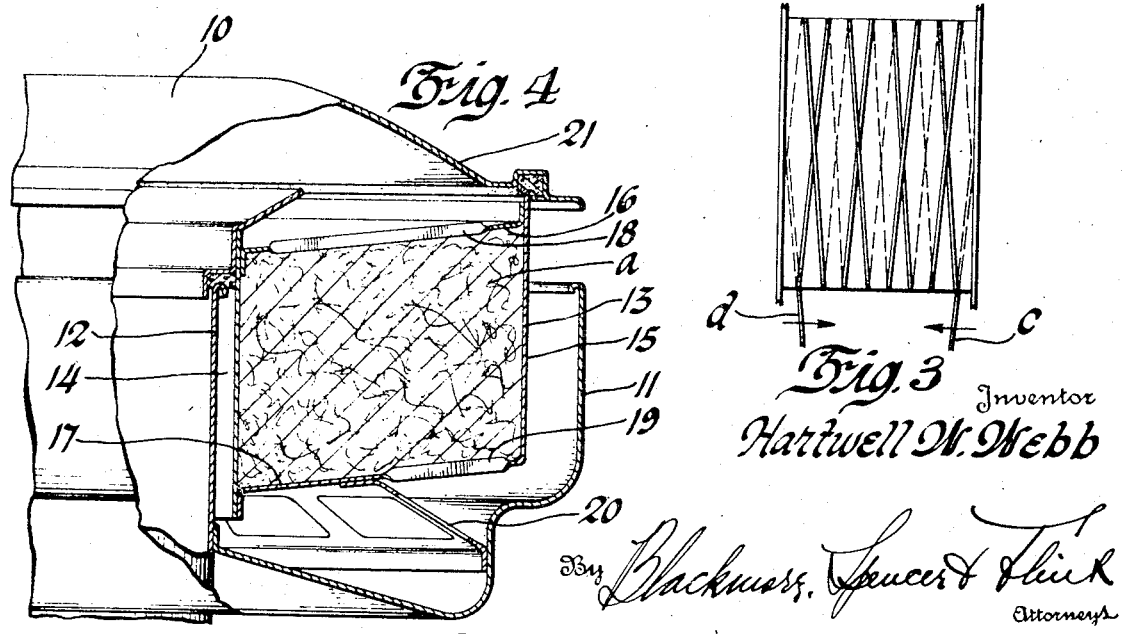
Inventor
Hartwell W. Webb
By Blackmore, Spencer & Flick
Attorneys Patented June 17, 1941

2,245,840

UNITED STATES PATENT OFFICE 2,245,840

FILTER MEDIUM

Hartwell W. Webb, Flint, Mich., assignor to General Motors Corporation, Detroit, Mich., a corporation of Delaware Application August 29, 1936, Serial No. 98,556

15 Claims. (Cl. 183—45)

This invention relates to apparatus for removing dust from air or other gases and, in particular, to a filter medium which consists of an interstitial body, through which air may pass, coated with a liquid which catches and retains the dust in the air.

The principal object of this invention is to provide a filter medium of the type described which will offer low, uniform and stable resistance to the passage of air and yet will afford sufficient liquid-coated surface to insure that the air which passes through it will be thoroughly freed from dust. It is a further object of this invention to provide a filter medium with the described characteristics which may be produced cheaply and economically.

The filter medium to which this invention relates is similar to that disclosed in my Patent No. 2,224,172, dated December 10, 1940, in that it is made of a number of flattened and deformed strands of copper wire by winding them upon themselves. But this invention is differentiated from that disclosed in that patent in that, among other things, the filter medium for each air cleaner is produced individually and is preferably wound directly upon an element of the air cleaner in which it is to be incorporated and in the method of winding.

For a better understanding of the nature and objects of this invention, reference is made to the following specification and the accompanying drawing wherein the invention is described and illustrated.

In the accompanying drawing:

Figure 1 is an enlarged fragmentary perspective view of a strand of the flattened and deformed copper wire from which is made the filter medium to which this invention relates;

Figures 2 and 3 are idealized diagrammatic illustrations of the winding operation employed in producing from the strand shown in Figure 1 the filter medium to which this invention relates. Figure 2 illustrates the operation at the start and Figure 3 the operation after one winding of each group of strands has been completed;

Figure 4 is a fragmentary view, mainly in vertical section, of an air cleaner in which there is incorporated a filter medium in accordance with my invention.

Filter media in accordance with my invention may be employed in any type of air cleaner in which a filter medium is incorporated. But they have been found particularly suited to air cleaners of the type shown in Figure 4 and for this reason I shall refer to this air cleaner whenever in the course of the description of my invention it becomes advantageous to refer to an air cleaner.

The air cleaner 10 shown in Figure 4 is of the oil bath type. In it are included a body which consists of a generally cup-shaped member 11 and a tube 12 through which cleaned air is conducted from the air cleaner. The tube 12 extends through a central opening in and is secured to the bottom of the cup-shaped member and forms therewith an annular receptacle which is partly filled with oil before the air cleaner is put into use. Within the upper end of the annular receptacle, there is disposed a hollow annular member 13 in which there is enclosed an oil-coated filter medium a in accordance with this invention. The member 13 consists of imperforate inner and outer cylindrical walls 14 and 15 joined by outwardly and upwardly inclined upper and lower walls 16 and 17 in which there are provided annular openings 18 and 19 which are bridged by narrow bars. The member 13 is supported from the upper end of the tube 12 and is of such shape and size that its lower wall is located above the level of the oil in the body 11—12 and its outer wall is spaced from and extends upwardly beyond the side wall of the cup-shaped member 11. From the lower wall of the member 13, there depends an anti-splash and anti-pull-over baffle 20. A cover 21 closes the upper ends of the member 13 and the tube 12 to the atmosphere but is so shaped that air can pass freely from the upper end of the former into the upper end of the latter when the air cleaner is operating.

It will, of course, be understood that when the air cleaner 10 is operating, air is drawn into the annular space between the outer wall of the member 13 and the side wall of the cup-shaped member 11, upwardly through the member 13 and out of the air cleaner through the tube 12. As it passes around the lower outer edge of the member 13, the air deposits some of the dirt which it carries in the oil in the bottom of the body 11—12 and picks up some of the oil. This oil and the dirt which remains in the air are carried by the air into the member 13 and deposited on the filter medium a.

In making a filter medium in accordance with this invention, I take several strands of rather small copper wire and flatten and suitably deform them. Then I take two groups of these flattened and deformed strands and interwind them around an arbor, preferably an element of the air cleaner in which the filter medium is to be incorporated, by moving the two groups of strands back and forth in opposite directions crosswise of their direction of travel as they are wound around the arbor. By this procedure, there is built upon the arbor an interstitial body whose components are maintained in the relative positions in which they are wound by reason of the interwinding and the interengagement of the deformations in the contiguous strands. After the interstitial body is completed, it is impregnated with a suitable liquid, such as oil, and is then ready for installation in the air cleaner in which it is to be incorporated. The interstitial body will offer little resistance to the passage of air in any direction, will be stable in form and will afford a large surface area which may be coated with liquid. Furthermore, if the pitch or pitches of the turns are properly selected with reference to the widths of the groups of strands employed, the interstitial body will also be of substantially uniform intersticity crosswise as well as lengthwise. And it may be added that because the flat surfaces of the strands are inevitably disposed at various angles in the interstitial body, and therefore, serve as deflectors, the air passing through the interstitial body will follow a devious course and, therefore, contact with a greater area of liquid-coated surface and be more thoroughly cleaned than it would if the flat surfaces were inclined in only one direction.

The copper wire employed in making the filter medium is preferably originally round and 0.007" to 0.008" in diameter. In the flattening and deforming operations, this round wire is preferably reduced to a thickness of 0.0016" to 0.0014" (exclusive of the ribs e hereinafter referred to) and a width of 0.022" to 0.032" and the form illustrated in Figure 1. The strand b shown in Figure 1 has in it undulations generally parallel to the flat surfaces of the strand, shorter undulations generally at right angles to the flat surfaces of the strand, and also undulations, longer than those first mentioned, at right angles to the flat surfaces of the strand. The strand has on its flat surfaces triangular ribs e about 0.001" high, about 0.002" wide at their bases and about 0.0125" apart which extend generally lengthwise of the strand. The ribs e stiffen the strands lengthwise and define channels which increase the oil-retaining capacity of the strands. The stiffness imparted to the strands by the ribs e makes it possible to superpose the larger on the smaller undulations at right angles to the flat surfaces of the strands without obliterating the latter and also lessen the tendency of the strands to straighten out during the winding operation.

The winding operation is illustrated diagrammatically in Figures 2 and 3 in which each of the groups c and d of strands is represented by a double line. Figure 2 represents the operation at the start and Figure 3 the operation after one winding of each group of strands has been completed. Figure 3 also illustrates the "wind" or structure of the filter medium a. This mode of illustrating the structure of the filter medium has been resorted to because it is impossible by depicting the filter medium itself to convey a clear conception of its construction. For the sake of clarity, there is represented in Figure 3, only one "winding" of each group of strands but it will be understood that the filter medium is many times thicker than the greatest dimension of the strands b and, consequently, that there are many of these windings superposed one on another in the completed filter medium.

It is apparent that the filter medium which is produced by the described procedure will afford a large area of dust-collecting surface and will be highly interstitial and, therefore, offer little resistance to the passage of air through it because the undulations in the strands prevent them interfitting closely. Jets of air, rather than a mechanical device, are preferably employed to impart transverse movement to the groups of strands as they are wound onto the reel because they tend to orientate the strands so that their flat surfaces are disposed parallel to the axis of the reel and, thus, reduce the resistance of the filter medium to the passage of air in the direction of the axis of the reel. However, this orientation is, of course, imperfect and, while the flat sides of the strands are, on the average, disposed more nearly parallel to the axis of the reel than in any other direction, they are disposed at various angles throughout the filter medium and, consequently, cause the air to pursue a devious path through it and to be more thoroughly cleansed than it would be if it followed an undeviating course. Since the "wind" employed in producing the filter medium is uniform, the resistance to the passage of air will be uniform throughout the filter medium. And since the undulations in the juxtaposed turns of the windings will cause them to interlock and half of each winding of each group of strands is disposed under the half over the corresponding winding of the other group, the structure and, therefore, the resistance of the filter medium to the passage of air is very stable.

In making a filter medium for an air cleaner of the type shown in Figure 4, the groups of strands b are preferably wound directly on the inner and upper wall assembly 14—16 of the member 13. After the inner and upper wall assembly is filled, an outer and lower wall unit 15—17 which may as the drawing indicates be made in one piece is assembled with it to enclose the filter medium a. Then after the assembly thus produced has been dipped to coat all of the strands b with oil it is ready for installation in the air cleaner 10.

I claim:

1. In an air cleaner, an interstitial filter medium which includes an liquid-wetted strand with ribs which define liquid-retaining channels on its surface.

2. In an air cleaner, an interstitial filter medium which includes a flat liquid-wetted strand of metal which is wavy in two non-coplanar directions and with ribs which extend lengthwise of the strand and define liquid-retaining channels on its flat surfaces.

3. In an air cleaner, an interstitial filter medium which includes groups of flat liquid-wetted strands which are wavy in two non-coplanar directions with ribs which extend lengthwise of the strands and define liquid-retaining channels on their flat surfaces wound so that each winding of each group is disposed partly under and partly over the corresponding winding of the other group.

4. A body interstitial in all directions in which there is included a flat metal strand whose flat surfaces are disposed more nearly parallel in one direction than in another.

5. In an interstitial body, a strand of metal which is ribbed lengthwise and in which there are impressed generally coplanar undulations of different pitches.

6. In an air cleaner, a filter medium through which air passes generally in one direction and in which there is included a flat metal strand whose flat surfaces are disposed more nearly parallel in the direction of travel of the air than in any other direction.

7. In an air cleaner, an interstitial filter medium which consists of a liquid-wetted mass of narrow and thin metal ribbon, the ribbon having on its flat sides minute ribs which extend generally lengthwise of the ribbon and are spaced apart distances several times greater than their transverse dimensions to define liquid-retaining channels on the flat sides of the ribbon.

8. In an air cleaner, an interstitial filter medium through which air passes generally in one direction, the filter medium consisting of a liquid-wetted mass of deformed metal ribbon with the flat sides of the ribbon disposed at various angles throughout the mass but more nearly parallel in the direction of travel of the air than in any other direction.

9. A tubular interstitial filter body for air cleaners and the like comprising a plurality of helical windings, each winding comprising a layer consisting of contiguous turns, corresponding layers of the two windings being criss-crossed so that a portion of the layer of one winding overlies part of the corresponding layer of the other winding and another portion of the said layer of the first winding underlies another part of the said corresponding layer of the other winding.

10. A tubular interstitial filter body for air cleaners and the like comprising a plurality of helical windings, each winding consisting of a plurality of layers made up of contiguous turns, each layer of each winding including a portion overlying part of the corresponding layer of the other winding and a portion underlying another part of the corresponding layer of the other winding.

11. In an air cleaner, an interstitial filter medium which includes a flat liquid-wetted strand with ribs which extend lengthwise of the strand and define liquid-retaining channels on its flat surface.

12. In an air cleaner, an interstitial filter medium which includes a flat liquid-wetted strand of metal in which there are generally coplanar undulations of different pitches and which has on its flat surfaces ribs which extend lengthwise of the strand and define liquid-retaining channels.

13. In an air cleaner, an interstitial filter medium which includes a flat liquid-wetted strand of metal in which there are generally coplanar undulations of different pitches and undulations in another plane and which has on its flat surfaces ribs which extend lengthwise of the strand and define liquid-retaining channels.

14. A tubular interstitial filter body for air cleaners and the like comprising a plurality of helical windings of groups of deformed strands, each winding consisting of a plurality of layers made up of contiguous turns, each layer of each winding including a portion overlying part of the corresponding layer of the other winding and a portion underlying another part of the corresponding layer of the other winding.

15. In an air cleaner, an interstitial filter medium through which air passes generally in one direction, the filter medium including a flat strand wound into a body with the flat sides of the strand disposed at various angles throughout the body but more nearly parallel in the direction of travel of the air than in any other direction.

HARTWELL W. WEBB.

CERTIFICATE OF CORRECTION.

Patent No. 2,245,840.　　　　　　　　　　　　　　　　　　June 17, 1941.

HARTWELL W. WEBB.

It is hereby certified that error appears in the above numbered patent requiring correction as follows: In the drawing, the figure in the lower right hand corner thereof should be designated as --Fig. 3--; page 2, second column, line 30, for "the" after "under" read --and--; line 54, claim 2, strike out "and" before "with"; and that the said Letters Patent should be read with this correction therein that the same may conform to the record of the case in the Patent Office.

Signed and sealed this 18th day of November, A. D. 1941.

(Seal)
　　　　　　　　　　　　　　　　　　　　　　　Henry Van Arsdale,
　　　　　　　　　　　　　　　　　　　Acting Commissioner of Patents.